Patented Feb. 29, 1944

2,342,678

UNITED STATES PATENT OFFICE 2,342,678

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application July 21, 1941, Serial No. 403,360

12 Claims. (Cl. 260—155)

This invention relates to new azo compounds and their application to the art of dyeing or coloring. Textile materials such as organic derivatives of cellulose, wool, silk, Nylon and Vinyon and lacquers composed of cellulose esters, cellulose ethers and vinyl derivatives, for example, can be colored. Coloration can be effected by dyeing, printing, stencilling or other suitable methods.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose.

It is an object of our invention to provide a new class of azo compounds. Another object is to provide a process for the dyeing or coloration of various textile materials including organic derivatives of cellulose, wool, silk, Nylon and Vinyon textile materials. A further object is to provide dyed textile materials which are of good fastness to light and washing and which possess good resistance to burnt gas fumes. Other objects will hereinafter appear.

The azo compounds of our invention, by means of which the above objects are accomplished or made possible, consist of the azo compounds having the formulas:

and

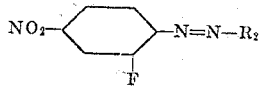

wherein R represents the residue of a benzene nucleus containing a $NO_2$ group in para position to the azo bond shown, $R_1$ represents the residue of a 1-alkyl-tetrahydroquinoline nucleus containing a low carbon alkyl group attached to the carbon atom in its 2-position and $R_2$ represents the residue of a member selected from the group consisting of a 1-alkyl-phenmorpholine nucleus and a 1-alkyl-tetrahydroquinoline nucleus, said 1-alkyl-tetrahydroquinoline and said 1-alkyl-phenmorpholine nuclei being joined to the azo bond through the carbon atom in the 6-position.

While our invention relates broadly to the azo compounds having the above formulas, it relates more particularly to the azo compounds having the formulas:

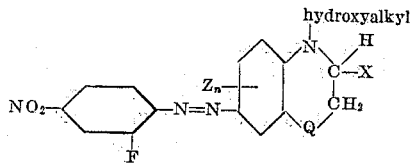

and

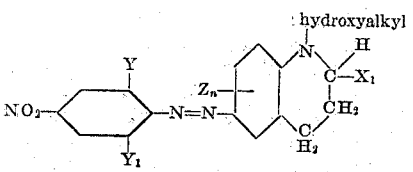

wherein X represents a member selected from the group consisting of hydrogen and a low carbon alkyl group, $X_1$ represents a low carbon alkyl group, Q represents a member selected from the group consisting of O and $-CH_2-$, Y represents a member selected from the group consisting of hydrogen and a halogen atom, $Y_1$ represents a member selected from the group consisting of hydrogen and a nitro group, Z represents a member selected from the group consisting of an alkyl group, an alkoxy group and a halogen atom and $n$ represents a member selected from the group consisting of 0, 1, 2 and 3.

For purposes of clarity, it is here noted that the alkyl group attached to the nitrogen atom forming a part of the tetrahydroquinoline and phenmorpholine nucleus is ordinarily an alkyl group such as methyl, ethyl, propyl, butyl, β-hydroxyethyl, β-hydroxypropyl, β,γ-dihydroxypropyl, γ-hydroxypropyl, Δ-hydroxybutyl, β-sulfoethyl, β-sulfatoethyl, β-methyl-β,γ-dihydroxypropyl and pentaerythrityl, for example. Similarly, by a low carbon alkyl group we refer more particularly to groups such as methyl, ethyl, propyl, butyl and β-hydroxyethyl.

Compounds wherein the alkyl group in the 2-position is methyl have been found particularly advantageous. Likewise, compounds wherein the alkyl group attached to the nitrogen atom of the tetrahydroquinoline or phenmorpholine nucleus is a hydroxyalkyl group appear to be generally advantageous and of these β,γ-dihydroxypropyl and β-methyl-β,γ-dihydroxypropyl appear to be most advantageous. Similarly, the presence of a methyl group in the 7-position appears to be advantageous.

Similarly, in the interest of clarity, it is here noted that the tetrahydroquinoline and phenmorpholine nuclei are numbered as indicated hereinafter.

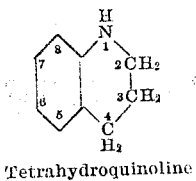

Tetrahydroquinoline

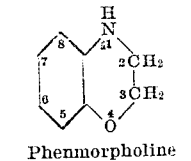

Phenmorpholine

The azo compounds of our invention constitute valuable dyes for the coloration of the materials hereinbefore named, especially for the coloration of cellulose acetate and Nylon. For the coloration of organic derivative of cellulose textile materials nuclear non-sulfonated compounds should be employed and it is to such compounds that our invention is more particularly directed. These compounds likewise can be used to color the other materials named herein. Nuclear sulfonated compounds of the invention, which can be prepared by sulfonation of the unsulfonated compounds, possess little or no utility for the coloration of organic derivative of cellulose textile materials but can be used to color wool and silk.

Generally speaking the dye compounds of our invention possess exceptional light fastness properties and as they yield valuable rubine and violet shades on cellulose acetate silk, one is able to dye this material light fast violet shades. So far as we are aware, previous attempts to secure such light fast violet shades on cellulose acetate have not been very successful. Our investigations lead us to believe that it is the presence of a single low carbon alkyl group, especially methyl, in the 2-position of the phenmorpholine or tetrahydroquinoline nucleus which effects such an improvement in the light fastness of the dyeings obtained. This discovery could not have been predicted.

Compounds of our invention, wherein diazotized p-nitro-o-fluoroaniline is employed have been found to yield shades which are quite different (being pinker) than those obtained where diazotized p-nitro-o-(Cl, Br, I) aniline is used. This also could not have been predicted. The new azo compounds of our invention possess the further advantages of being easily dischargeable and of having superior resistance to burnt gas fumes. Other advantages include good affinity for cellulose acetate silk and the ability to dye this material rapidly at relatively low temperatures.

The azo compounds of our invention can be prepared by diazotizing p-nitroaniline compounds and coupling the diazonium compounds obtained with the tetrahydroquinoline and phenmorpholine compounds indicated hereinbefore.

The following examples illustrate the preparation of the azo compounds of our invention:

EXAMPLE 1

1 gram mole of p-nitroaniline is diazotized in known fashion, freed of nitrous acid by means of urea, following which the diazonium compound obtained is added to an iced hydrochloric acid solution of 1 gram mole of 1-$\beta,\gamma$-dihydroxypropyl-2-methyltetrahydroquinoline. The coupling reaction which takes place is completed by adding sodium carbonate until the reaction mixture is neutral to Congo red paper. The dye compound formed is recover by filtration, washed with water and dried. The dye compound obtained colors the textile materials named hereinbefore red shades which are fast to light.

EXAMPLE 2

1 gram mole of 1-amino-2-chloro-4-nitrobenzene is diazotized in a hydrochloric acid or sulfuric acid medium in known fashion and the diazonium compound obtained is coupled with 1 gram mole of 1-$\beta,\gamma$-dihydroxypropyl-2,7-dimethyltetrahydroquinoline. Coupling and recovery of the dye compound formed can be carried out as described in Example 1. It is here noted that in preparing 7-alkyl-2-alkyltetrahydroquinolines some of the 5-alkyl-2-alkyltetrahydroquinoline compound is formed. Accordingly, it will be understood that some 1-$\beta,\gamma$-dihydroxypropyl-2,5-dimethyltetrahydroquinoline is present in the coupling component of this example. The dye mixture obtained colors the textile materials previously named and especially cellulose acetate silk and Nylon rubine shades which are very fast to light.

EXAMPLE 3

1 gram mole of 1-amino-2,4-dinitrobenzene is diazotized in nitrosyl sulfuric acid, freed of nitrous acid by means of urea or sulfamic acid, and the diazonium compound formed is poured into water and coupled with 1 gram mole of 1-$\beta,\gamma$-dihydroxypropyl-2,7-dimethyltetrahydroquinoline. Coupling and recovery of the dye compound formed can be carried out in accordance with the procedure described in Example 1. The dye compound obtained colors the textile materials named herein violet shades which are fast to light.

EXAMPLE 4

1 gram mole of 1-amino-2,4-dinitro-6-chlorobenzene is diazotized in a hydrochloric acid or sulfuric acid medium and the diazonium compound obtained is coupled with 1 gram mole of 1-$\beta,\gamma$-dihydroxypropyl-2,7-dimethyltetrahydroquinoline. Coupling and recovery of the dye compound formed can be carried out in accordance with the procedure described in Example 3. The dye compound obtained colors cellulose acetate silk reddish-blue shades of excellent light fastness.

1 gram mole of 1-$\beta$-methyl-$\beta,\gamma$-dihydroxypropyl-2,7-dimethyltetrahydroquinoline can be substituted for the coupling component of the example to obtain a dye which similarly colors cellulose acetate silk reddish-blue shades of excellent light fastness.

EXAMPLE 5

1 gram mole of 1-amino-2,4-dinitro-6-cyanobenzene is diazotized and the diazonium compound obtained is coupled with 1 gram mole of 1-$\beta,\gamma$-dihydroxypropyl-2-ethyl-3-methyl-7-methoxytetrahydroquinoline. Coupling and recovery of the dye compound formed can be carried out in accordance with the general procedure described in Example 3. The dye compound obtained colors cellulose ester fabrics reddish-blue shades fast to light.

EXAMPLE 6

1 gram mole of 1-amino-2-fluoro-4-nitrobenzene is diazotized with sodium nitrite in a hydrochloric acid or sulfuric acid medium and the diazonium compound obtained is added to an iced hydrochloric acid solution of 1-$\beta,\gamma$-dihydroxypropyl-2,7-dimethyltetrahydroquinoline. The coupling reaction which takes place is completed by adding sodium carbonate until the mixture is neutral to Congo red paper. The dye compound formed is recovered by filtration, washed with water and dried. The dye compound thus obtained colors cellulose acetate silk pinkish-violet shades which are very fast to light.

EXAMPLE 7

1 gram mole of 1-amino-2-fluoro-4-nitrobenzene is diazotized and the diazonium compound obtained is added to an acetic acid solution of 1-γ-sulfatopropyl-2-methylphenmorpholine. The coupling reaction which takes place is completed by adding sodium carbonate until the reaction mixture is just neutral to Congo red paper following which the reaction mixture is poured into water and the dye compound precipitated by the addition of sodium chloride. Upon recovery of the dye compound by filtration and drying, a dye compound is obtained which colors cellulose acetate silk a pinkish rubine shade which is fast to light.

EXAMPLE 8

1 gram mole of 1-amino-2-fluoro-4-nitrobenzene is diazotized and the diazonium compound obtained is coupled with 1 gram mole of 1-sodium-β-sulfoethyl-2-methyl-7-chlorotetrahydroquinoline. Coupling and recovery of the dye compound formed can be carried out in accordance with the procedure described in Example 7. The dye compound obtained colors cellulose acetate silk pinkish-rubine shades which are fast to light.

EXAMPLE 9

1 gram mole of 1-amino-2-fluoro-4-nitrobenzene is diazotized and the diazonium compound obtained is coupled with 1 gram mole of 1-β-hydroxyethyl-2-methyl-tetrahydroquinoline. Coupling and recovery of the dye compound formed can be carried out in accordance with the procedure described in Example 6. The dye compound obtained colors cellulose acetate silk pinkish-rubine.

By the substitution of 1 gram mole of 1-β-hydroxy-ethyl-2-methylphenmorpholine for the coupling component of the example, a dye compound is obtained which colors cellulose acetate silk pinkish-rubine.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 9, inclusive.

| Amine | Coupling component | Color |
|---|---|---|
| p-Nitroaniline | (1) 1-β,γ-dihydroxypropyl-2-methyltetrahydroquinoline | Red to rubine. |
| Do | (2) 1-β,γ-dihydroxypropyl-2-ethyltetrahydroquinoline | Do. |
| Do | (3) 1-β,γ-dihydroxypropyl-2-ω-methoxymethyltetrahydroquinoline | Do. |
| Do | (4) 1-β,γ-dihydroxypropyl-2-ω-methoxyethyltetrahydroquinoline | Do. |
| Do | (5) 1-β,γ-dihydroxypropyl-2-propyltetrahydroquinoline | Do. |
| Do | (6) 1-β-methyl-β,γ-dihydroxypropyl-2-methyltetrahydroquinoline | Do. |
| Do | (7) 1-pentaerythrityl-2-methyltetrahydroquinoline | Do. |
| Do | (8) 1-glycosyl-2-methyltetrahydroquinoline | Do. |
| Do | (9) 1-β-hydroxyethyl-2-methyltetrahydroquinoline | Do. |
| Do | (10) 1-β-hydroxypropyl-2-methyltetrahydroquinoline | Do. |
| Do | (11) 1-β,γ-dihydroxypropyl-2,7-dimethyltetrahydroquinoline | Do. |
| Do | (12) 1-β,γ-dihydroxypropyl-2,5-dimethyltetrahydroquinoline | Do. |
| Do | (13) 1-β,γ-dihydroxypropyl-2-ethyl-5-methyltetrahydroquinoline | Do. |
| Do | (14) 1-β,γ-dihydroxypropyl-2-methyl-5-ethyltetrahydroquinoline | Do. |
| Do | (15) 1-β,γ-dihydroxypropyl-2-methyl-5-methoxytetrahydroquinoline | Do. |
| Do | (16) 1-β,γ-dihydroxypropyl-2-methyl-7-ethoxytetrahydroquinoline | Do. |
| Do | (17) 1-β,γ-dihydroxypropyl-2-methyl-5-methyl-8-methoxytetrahydroquinoline | Do. |
| Do | (18) 1-β,γ-dihydroxypropyl-2-methyl-5-methyl-8-ethoxytetrahydroquinoline | Do. |
| Do | (19) 1-β,γ-dihydroxypropyl-2-methyl-8-methoxytetrahydroquinoline | Do. |
| Do | (20) 1-β,methyl-β,γ-dihydroxypropyl-2,7-dimethyltetrahydroquinoline | Do. |
| Do | (21) 1-β-hydroxyethyl-2,5-dimethyltetrahydroquinoline | Do. |
| Do | (22) 1-β,γ-dihydroxypropyl-2-β-hydroxyethyltetrahydroquinoline | Do. |
| 1-amino-2-chloro-4-nitrobenzene | 1-22 above | Rubine to bluish-rubine. |
| 1-amino-2-bromo-4-nitrobenzene | do | Do. |
| 1-amino-2-iodo-4-nitrobenzene | do | Do. |
| 1-amino-2-cyano-4-nitrobenzene | do | Do. |
| 1-amino-2-carbethoxy-4-nitrobenzene | do | Do. |
| 1-amino-2-hydroxy-4-nitrobenzene | do | Do. |
| 1-amino-2-(methoxy, ethoxy)-4-nitrobenzene | do | Pinkish-rubine. |
| 2,4-dinitroaniline | do | Rubine. |
| 1-amino-2,4-dinitro-6-chlorobenzene | do | Rubine to violet. |
| 1-amino-2,4-dinitro-6-bromobenzene | do | Violet to reddish-blue. |
| 1-amino-2,4-dinitro-6-iodobenzene | do | Do. |
| 1-amino-2,4-dinitro-6-hydroxybenzene | do | Do. |
| 1-amino-2,4-dinitro-6-cyanobenzene | do | Reddish-blue to blue. |
| 1-amino-2-fluoro-4-nitrobenzene | (23) 1-β-hydroxyethyltetrahydroquinoline | Violet to reddish-blue. |
| Do | (24) 1-β-hydroxypropyl-2-methylphenmorpholine | Pinkish-rubine. |
| Do | (25) 1-β-hydroxypropylphenmorpholine | Do. |
| Do | (26) 1-β-hydroxypropyl-2-methyltetrahydroquinoline | Do. |
| Do | (27) 1-γ-hydroxypropyl-2-methyltetrahydroquinoline | Do. |
| Do | (28) 1-β,γ-dihydroxypropyl-2-methyltetrahydroquinoline | Do. |
| Do | (29) 1-β,γ-dihydroxypropyl-7-methyltetrahydroquinoline | Do. |
| Do | (30) 1-β,γ-dihydroxypropyl-7-methylphenmorpholine | Pinkish-violet. |
| Do | (31) 1-β,γ-dihydroxypropyl-2,7-dimethylphenmorpholine | Do. |
| Do | (32) 1-β,γ-dihydroxypropyl-7-chlorophenmorpholine | Do. |
| Do | (33) 1-β,γ-dihydroxypropyl-7-chlorotetrahydroquinoline | Pinkish-red. |
| Do | (34) 1-β,γ-dihydroxypropyl-5-methylphenmorpholine | Do. |
| Do | (35) 1-β,γ-dihydroxypropyl-2,5-dimethylphenmorpholine | Pinkish-violet. |
| Do | (36) 1-β,γ-dihydroxypropyl-2,5-dimethyltetrahydroquinoline | Do. |
| Do | (37) 1-pentaerythrityl-2-methyltetrahydroquinoline | Do. |
| Do | (38) 1-pentaerythrityl-2,7-dimethyltetrahydroquinoline | Pinkish-rubine. |
| Do | (39) 1-pentaerythrityl-2,7-dimethylphenmorpholine | Pinkish-violet. |
| Do | (40) 1-β-sulfoethyl-2-methylphenmorpholine | Do. |
| Do | (41) 1-β-sulfoethyl-2,7-dimethylphenmorpholine | Pinkish-rubine. |
| Do | (42) 1-β-sulfoethyl-7-chloro-2-methylphenmorpholine | Pinkish-violet. |
| Do | (43) 1-β-methoxyethyl-2-methyltetrahydroquinoline | Pinkish-red. |
| Do | (44) 1-β-methoxyethyl-2-methylphenmorpholine | Pinkish-rubine. |
| | | Do. |

It will be understood that the foregoing examples are intended to be illustrative and not limitative of the invention and that, within the teachings of the invention, any of the diazonium compounds disclosed herein can be coupled with any of the coupling components of our invention. Additional coupling components that can be employed include, for example, 1-β,γ-dihydroxypropyl-2-methyl-7-bromophenmorpholine, 1-β,γ-dihydroxypropyl-2-methyl-7-bromotetrahydroquinoline, 1-β-methyl-β,γ-dihydroxypropyl-2-methyl-5-bromophenmorpholine and 1-β-methyl-β,γ-dihydroxypropyl - 2 - methyl - 5 - bromotetrahydroquinoline.

The tetrahydroquinoline coupling compounds employed in the preparation of the azo compounds of our invention can be prepared by hydrogenating the corresponding quinoline compounds, unsubstituted in the ring nitrogen atom, and then introducing the alkyl substituent present on the ring nitrogen atom by methods known to the art for their introduction. The examples given hereinafter are illustrative of the hydrogenation and alkylation reactions employed.

HYDROGENATION

*Preparation of 2-methyl tetrahydroquinoline*

One gram mole of 2-methyl quinoline is reacted with hydrogen at a temperature of about 90° C. in the presence of 10 grams of a finely divided nickel catalyst such as Raney nickel under a hydrogen pressure of about 1500 pounds per square inch. Upon completion of the reaction, the 2-methyl tetrahydroquinoline formed is recovered, for example, by distillation under reduced pressure. Completion of the reaction can be determined, for example, by measuring the amount of hydrogen added to the pressure vessel to obtain the desired pressure and then, while maintaining the desired pressure, adding hydrogen until the amount required to produce the tetrahydroquinoline compound has been introduced. Again if excess hydrogen is originally added to the pressure vessel and no further hydrogen added the reaction is complete when the pressure remains substantially constant. As will be understood, the temperature and pressure conditions employed can be varied over wide limits. Those given, however, are suitable and can be used to successfully hydrogenate other quinoline compounds to obtain the corresponding tetrahydroquinoline compounds.

ALKYLATION

*Preparation of 1-β,γ-dihydroxypropyl-2-methyl tetrahydroquinoline*

1 gram mole of 2-methyl tetrahydroquinoline, 1.2 gram mole of sodium bicarbonate and 1.2 gram mole of glyceryl chlorohydrin are heated together in a reaction vessel with stirring at 140° C. for five hours. Following completion of the reaction, water is added to the reaction mixture which is then steam distilled to remove any unreacted 2-methyl tetrahydroquinoline. The desired compound is then recovered from the reaction mixture in known fashion and can be used without further purification.

*Preparation of 1-β-hydroxyethyl-2,7-dimethyl tetrahydroquinoline*

1 gram mole of 2,7-dimethyl tetrahydroquinoline is charged into an autoclave and heated at 180° C. with 1.1 gram mole of ethylene oxide for six hours. The reaction mixture is then permitted to cool following which the desired product is recovered by distilling the reaction mixture under reduced pressure.

The corresponding β-hydroxyl propyl compound can be similarly prepared by using propylene oxide in place of ethylene oxide.

*Preparation of 1-sodium-β-sulfoethyl-7-chloro-tetrahydroquinoline*

1 gram mole of 7-chlorotetrahydroquinoline, 1.1 gram mole of sodium-β-bromoethanesulfonate and 1.1 gram mole of sodium bicarbonate are heated together in a suitable reaction vessel to 120-150° C. for several hours. When no more carbon dioxide is evolved, the reaction mixture is poured into water, steam distilled to remove unreacted 7-chlorotetrahydroquinoline and the remaining solution concentrated to produce crystallization of the desired product.

The phenmorpholine coupling compounds employed in the preparation of the azo compounds of our invention can be prepared by alkylation of the corresponding phenmorpholine compounds which are unsubstituted in the ring nitrogen atom. Alkylation can be carried out in the same manner as described for the tetrahydroquinoline compounds and is illustrated by the following examples.

*Preparation of 1-γ-hydroxypropyl-2-methyl phenmorpholine*

1 gram mole of 2-methyl phenmorpholine is reacted with 1.1 gram mole of trimethylene chlorohydrin and 0.6 gram mole of sodium carbonate in a suitable reaction vessel at 140° C. for five hours. The desired product may be recovered from the reaction mixture by distillation under reduced pressure.

*Preparation of 1-sodium-β-sulfatoethyl-2,7-dimethyl phenmorpholine*

1 gram mole of 1-β-hydroxyethyl-2,7-dimethylphenmorpholine are dissolved in carbon tetrachloride and 1 gram mole of chlorosulfonic acid is added and the reaction conducted without heating; the reaction being completed by warming slightly. Sodium carbonate is then added to the reaction mixture until it is neutral to Congo red paper. The carbon tetrachloride may be largely removed by distillation following which the desired product can be obtained by crystallization on evaporation of the remaining carbon tetrachloride.

Additional information regarding the preparation of phenmorpholine compounds is to be found in McNally and Dickey U. S. Patent No. 2,196,222, issued April 9, 1940. Similarly, additional information concerning the preparation of tetrahydroquinoline compounds will be found in Dickey and McNally application Serial No. 306,201, filed November 25, 1939.

The azo compounds of our invention are, for the most part, relatively insoluble in water and, accordingly, they may be advantageously directly applied to the material undergoing coloration in the form of an aqueous suspension which can be prepared by grinding the dye to a paste in the presence of a sulfonated oil, soap or other suitable dispersing agent and dispersing the resulting paste in water. In some instances, the dye may possess sufficient solubility in water as to render the use of a dispersing agent unnecessary. Generally speaking, however, the use of a dispersing agent is desirable.

Direct dyeing operations can, with advantage, be conducted at temperatures of about 75-85° C.

but any suitable temperature may be used. Thus, the textile material to be dyed or colored is ordinarily added to the dyebath at a temperature lower than that at which the main portion of the dyeing is to be effected, a temperature approximating 45-55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. Generally speaking, 1-3% by weight of dye to material is employed although any desired proportions can be used.

Suitable dispersing agents together with the amounts that may be employed are disclosed in McNally and Dickey Patent No. 2,115,030, issued April 26, 1938. The process disclosed in this patent for the dyeing of cellulose acetate silk can be used in applying the dyes of the present application to this material.

It will be understood that the other textile materials named hereinbefore can be directly colored from an aqueous dyebath in a similar manner as cellulose acetate silk. However, other suitable methods for the dyeing of these materials are known to those skilled in the art and these methods, of course, can be used in applying the dye compounds of this application if desired. We would further note that, while colors yielded by the dye compounds have been given primarily with reference to cellulose acetate silk, generally similar colors are ordinarily obtained on the other materials.

We claim:
1. The azo compounds having the formula:

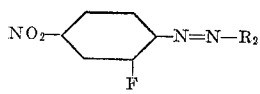

wherein $R_2$ represents the residue of a 1-alkyl tetrahydroquinoline nucleus containing a low carbon alkyl hydrocarbon group attached to the carbon atom in its 2-position and wherein said 1-alkyl tetrahydroquinoline nucleus is joined to the azo bond shown through the carbon atom in its 6-position.

2. The azo compounds having the formula:

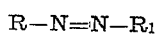

wherein R represents the residue of a benzene nucleus containing a $NO_2$ group in para position to the azo bond shown, $R_1$ represents the residue of a 1-alkyl tetrahydroquinoline nucleus containing a low carbon alkyl hydrocarbon group attached to the carbon atom in its 2-position and wherein said 1-alkyl tetrahydroquinoline nucleus is joined to the azo bond shown through the carbon atom in its 6-position.

3. The azo compounds having the formula:

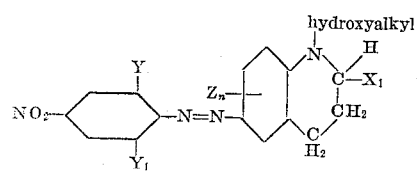

wherein $X_1$ represents a low carbon alkyl hydrocarbon group, Y represents a member selected from the group consisting of hydrogen and a halogen atom, $Y_1$ represents a member selected from the group consisting of hydrogen and a nitro group, Z represents a member selected from the group consisting of an alkyl group, an alkoxy group and a halogen atom and $n$ represents a member selected from the group consisting of 0, 1, 2 and 3.

4. The azo compounds having the formula:

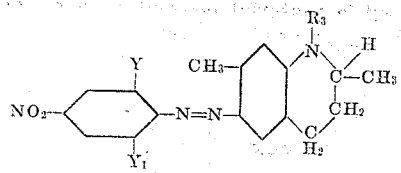

wherein $R_3$ represents a $\beta,\gamma$-dihydroxypropyl radical, Y represents a member selected from the group consisting of hydrogen and a halogen atom and $Y_1$ represents a member selected from the group consisting of hydrogen and a nitro group.

5. The azo compound having the formula:

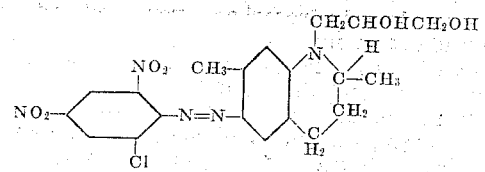

6. The azo compound having the formula:

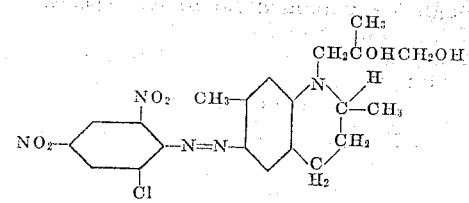

7. The azo compounds having the formula:

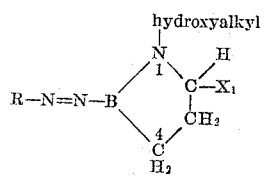

wherein R represents the residue of a benzene nucleus containing a nitro group in para position to the azo bond shown, B represents the residue of a benzene nucleus, $X_1$ represents a low carbon alkyl hydrocarbon group, wherein the nitrogen atom numbered 1 is joined to a carbon atom of the benzene nucleus B in para position to the azo bond shown and wherein the carbon atom numbered 4 is joined to a carbon atom of the benzene nucleus B in meta position to the azo bond shown and wherein the tetrahydroquinoline nucleus is joined to the azo bond shown through the carbon atom in its 6-position.

8. The azo compound having the formula:

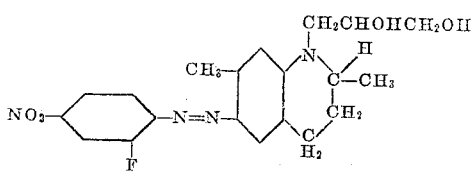

9. Textile material colored with an azo dye compound having the formula:

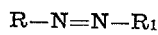

wherein R represents the residue of a benzene nucleus containing a nitro group in para position to the azo bond shown, $R_1$ represents the residue of a 1-alkyltetrahydroquinoline nucleus containing a low carbon alkyl hydrocarbon group attached to the carbon atom in its 2-position and wherein said 1-alkyltetrahydroquinoline nucleus is joined to the azo bond shown through the carbon atom in its 6-position.

10. Textile material colored with an azo dye compound having the formula:

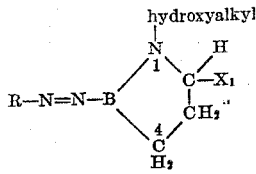

wherein R represents the residue of a benzene nucleus containing a nitro group in para position to the azo bond shown, B represents the residue of a benzene nucleus, $X_1$ represents a low carbon alkyl hydrocarbon group, wherein the nitrogen atom numbered 1 is joined to a carbon atom of the benzene nucleus B in para position to the azo bond shown and wherein the carbon atom numbered 4 is joined to a carbon atom of the benzene nucleus B in meta position to the azo bond shown and wherein the tetrahydroquinoline nucleus is joined to the azo bond shown through the carbon atom in its 6-position.

11. A cellulose acetate colored with a nuclear non-sulfonated azo dye compound having the formula:

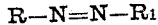

wherein R represents the residue of a benzene nucleus containing a nitro group in para position to the azo bond shown, $R_1$ represents the residue of a 1-alkyltetrahydroquinoline nucleus containing a low carbon alkyl hydrocarbon group attached to the carbon atom in its 2-position and wherein said 1-alkyltetrahydroquinoline nucleus is joined to the azo bond shown through the carbon atom in its 6-position.

12. A cellulose acetate colored with a nuclear non-sulfonated azo dye compound having the formula:

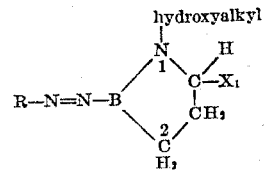

wherein R represents the residue of a benzene nucleus containing a nitro group in para position to the azo bond shown, B represents the residue of a benzene nucleus, $X_1$ represents a low carbon atom alkyl hydrocarbon group, wherein the nitrogen atom numbered 1 is joined to a carbon atom of the benzene nucleus B in para position to the azo bond shown and wherein the carbon atom numbered 4 is joined to a carbon atom of the benzene nucleus B in meta position to the azo bond shown and wherein the tetrahydroquinoline nucleus is joined to the azo bond shown through the carbon atom in its 6-position.

JAMES G. McNALLY.
JOSEPH B. DICKEY.